T. N. JORDAN.
TIRE.
APPLICATION FILED FEB. 10, 1915.

1,165,512.

Patented Dec. 28, 1915.

Witnesses
R. L. Parker
R. M. Clark

Thomas N. Jordan, Inventor by

Attorneys

UNITED STATES PATENT OFFICE.

THOMAS N. JORDAN, OF LONG BEACH, MISSISSIPPI.

TIRE.

1,165,512.   Specification of Letters Patent.   Patented Dec. 28, 1915.

Application filed February 10, 1915.   Serial No. 7,309.

*To all whom it may concern:*

Be it known that I, THOMAS N. JORDAN, a citizen of the United States, residing at Long Beach, in the county of Harrison and State of Mississippi, have invented a new and useful Tire, of which the following is a specification.

The object of this invention is to provide a wheel tire embodying a core of novel form, adapted to be placed readily within a casing, and so constructed as to combine the necessary resiliency with the requisite strength to resist abnormal distortions.

Figure 1:
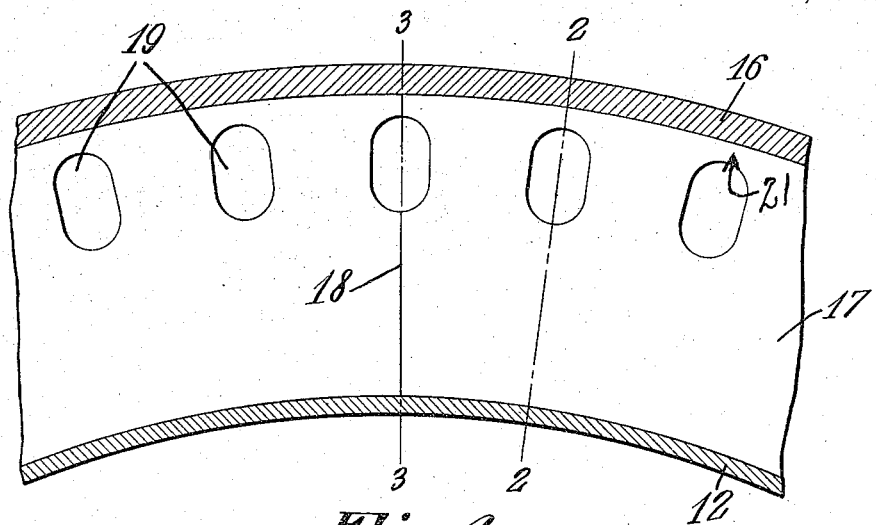
Figures 2, 3:
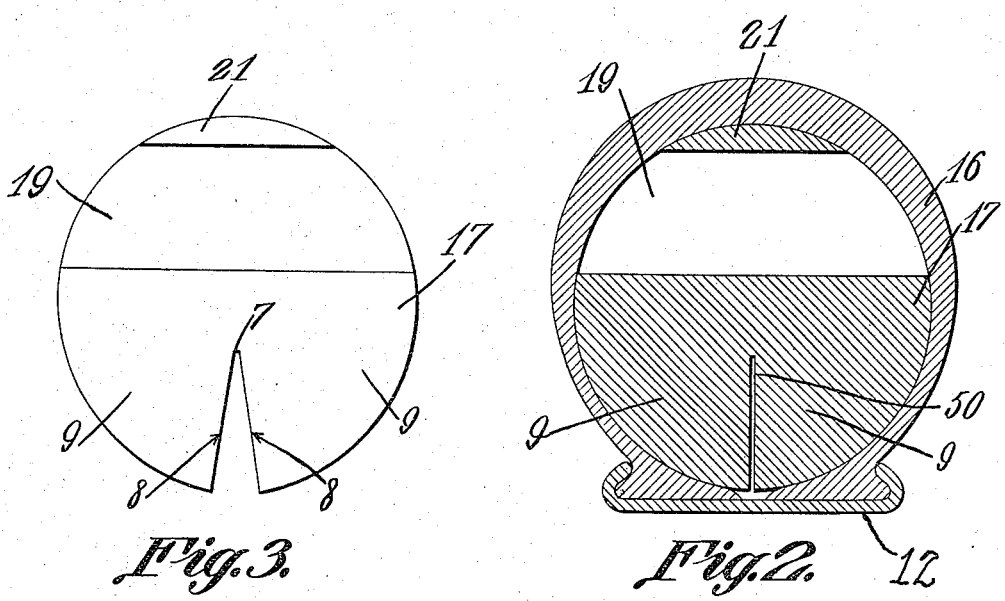

In the drawings, Figure 1 is a fragmental longitudinal section; Fig. 2 is a cross section on the line 2—2 of Fig. 1; Fig. 3 is a cross section on the line 3—3 of Fig. 1, the casing and the rim being omitted.

In carrying out the present invention there is provided a rim 12 with which is assembled a casing 16. A resilient core 17 substantially fills the casing 16, that face of the core 17 which is adjacent the rim 12 being provided with a V-shaped groove 7 embodying plain continuous walls 8 and defining side flanges 9 which are brought together to form a slit 50 of inappreciable width when the core 17 is inclosed by the casing 16. The core 17 is provided with a single set of transverse openings 19 extended entirely therethrough, the openings 19 being spaced circumferentially from each other by a distance greater than the circumferential widths of the openings, the openings being located close to the tread of the core 17 but being spaced therefrom to define a continuous tread strip 21. The openings 19 are elongated radially from the tread of the core 17 toward the inner curve thereof thereby to facilitate a bringing together of the side flanges 9. The ends of the core 17 are denoted by the reference character 18.

Having thus described the invention, what is claimed is:—

In a device of the class described, a rim; a casing assembled with the rim; and a resilient core substantially filling the casing, that face of the core which is adjacent the rim being provided with a V-shaped groove embodying plane continuous walls and defining side flanges which are brought together to form a slit of inappreciable width when the core is inclosed by the casing; the core being provided with a single set of transverse openings extended entirely therethrough, the openings being spaced circumferentially from each other by a distance greater than the circumferential widths of the openings, the openings being located close to the tread of the core but being spaced therefrom to define a continuous tread strip, the openings being elongated radially from the tread of the core toward the inner curve thereof, thereby to facilitate a bringing together of the side flanges.

In testimony that I claim the foregoing as my own, I have hereto affixed my signature in the presence of two witnesses.

THOMAS N. JORDAN.

Witnesses:
L. C. WESTBROOK,
L. B. JOYCE.

Copies of this patent may be obtained for five cents each, by addressing the "Commissioner of Patents, Washington, D. C."